United States Patent
Yost et al.

(10) Patent No.: US 6,644,432 B1
(45) Date of Patent: Nov. 11, 2003

(54) ELECTRIC POWER STEERING ASSEMBLY

(75) Inventors: Sandi M. Yost, Chesterfield Township, MI (US); Anita L. Holtzapple, Auburn Hills, MI (US)

(73) Assignee: TRW Automotive U.S. LLC, Cleveland, OH (US)

( * ) Notice: Subject to any disclaimer, the term of this patent is extended or adjusted under 35 U.S.C. 154(b) by 0 days.

(21) Appl. No.: 10/186,181

(22) Filed: Jun. 27, 2002

(51) Int. Cl.[7] .................................................. B62D 5/04
(52) U.S. Cl. ..................................... 180/444; 74/388 PS
(58) Field of Search ................................ 180/443, 444; 74/422, 388 PS

(56) References Cited

U.S. PATENT DOCUMENTS

| | | | |
|---|---|---|---|
| 4,825,972 A | 5/1989 | Shimizu | 180/79.1 |
| 6,155,376 A | 12/2000 | Cheng | 180/444 |
| 6,454,044 B1 * | 9/2002 | Menjak et al. | 180/444 |

* cited by examiner

*Primary Examiner*—Lesley D. Morris
*Assistant Examiner*—L. Lum
(74) *Attorney, Agent, or Firm*—MacMillan, Sobanski & Todd, LLC

(57) ABSTRACT

This invention relates to an improved structure for a rack drive assembly adapted for use in a vehicle electric power steering assembly. The electric power steering assembly includes a steering member (32), a one piece integral ball nut and pulley member (70), a lone bearing unit (90), and an electric motor (60). The steering member (32) is disposed in a rack housing (30) and includes a rack portion (34) operatively connected to a vehicle steering wheel (12) and a screw portion (40). The one piece integral ball nut and pulley member (70) is operatively connected to the screw portion (40) of the rack portion (34) of the steering member (32) for effecting axial movement of the steering member (32) upon rotation of the vehicle steering wheel (12). The ball nut and pulley member (70) includes a ball nut portion (72) and a pulley portion (76). The lone bearing unit (90) is carried by the ball nut and pulley member (70) for rotatably supporting the ball nut portion (72) relative to the steering member (32). The electric motor is operatively connected to the ball nut and pulley member (70) by the pulley portion (76).

16 Claims, 4 Drawing Sheets

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated.

One example of an electric power steering assembly wherein an electric motor output shaft is connected via a belt to a pulley assembly is disclosed in U.S. Pat. No. 4,825,972 to Shimizu. In the Shimuzu patent, an electric motor has a toothed small diameter pulley fixed on an output shaft of the motor. The toothed small diameter pulley is connected through a timing belt to a toothed large diameter pulley formed on an outer circumference of a ball bearing nut. The ball nut is rotatably supported at both ends thereof in a casing by means of angular contact bearings which are axially biased with a plate spring to eliminate axial play. In operation, the rotation of the motor is transmitted to the ball bearing nut which through rolling balls causes a rack shaft to move in a straight linear motion.

SUMMARY OF THE INVENTION

This invention relates to an improved structure for a rack drive assembly adapted for use in a vehicle electric power steering assembly. The electric power steering assembly of the present invention includes a steering member, a one piece integral ball nut and pulley member, a lone bearing unit, and an electric motor. The steering member is disposed in a rack housing and includes a rack portion operatively connected to a vehicle steering wheel and a screw portion. The one piece integral ball nut and pulley member is operatively connected to the screw portion of the rack portion of the steering member for effecting axial movement of the steering member upon rotation of the vehicle steering wheel. The ball nut and pulley member includes a ball nut portion and a pulley portion. The lone bearing unit is carried by the ball nut and pulley member for rotatably supporting the ball nut portion relative to the steering member. The electric motor is operatively connected to the ball nut and pulley member by the pulley portion.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
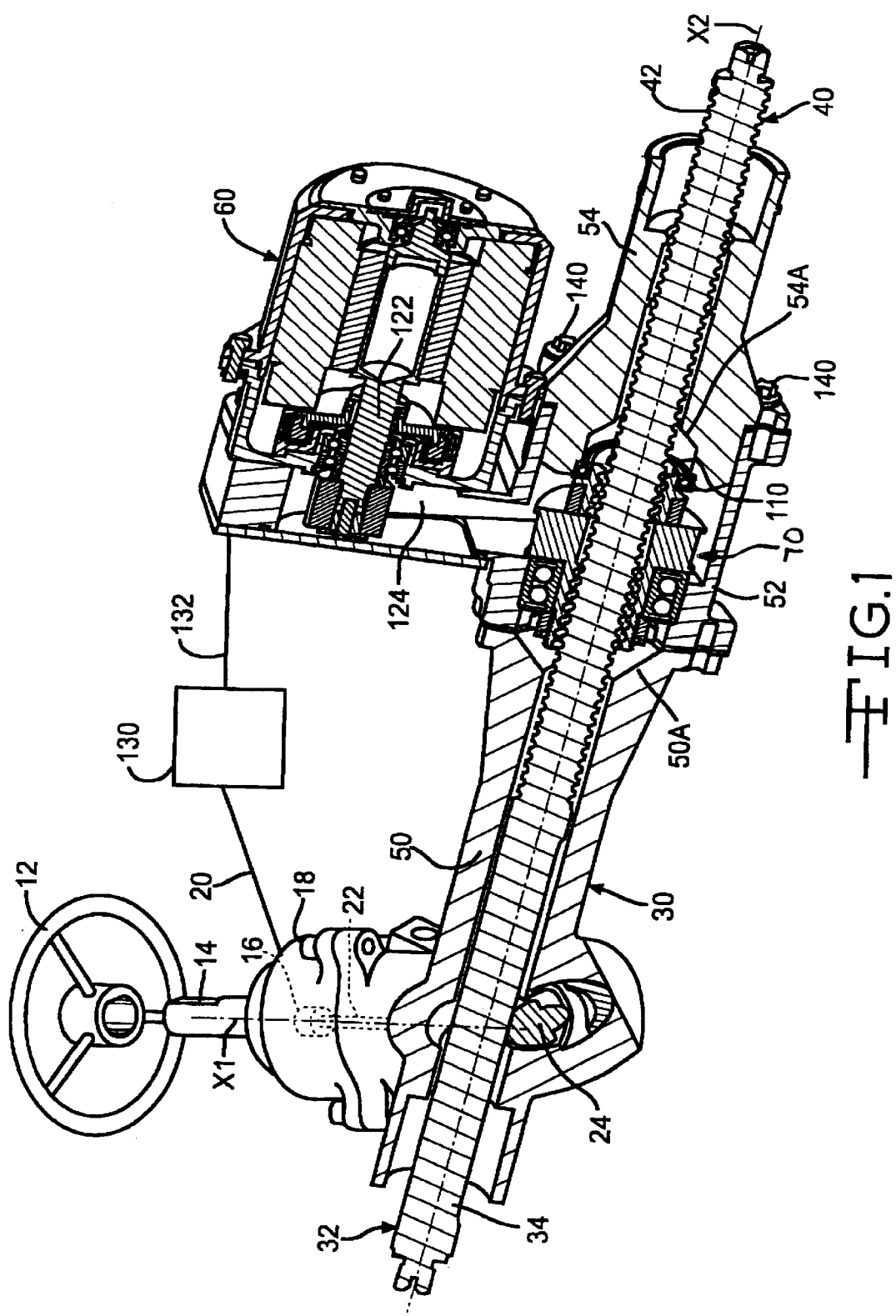
FIG. 1 is a sectional view of a portion of a first embodiment of a vehicle electric power steering assembly in accordance with the present invention.
Figure 2:
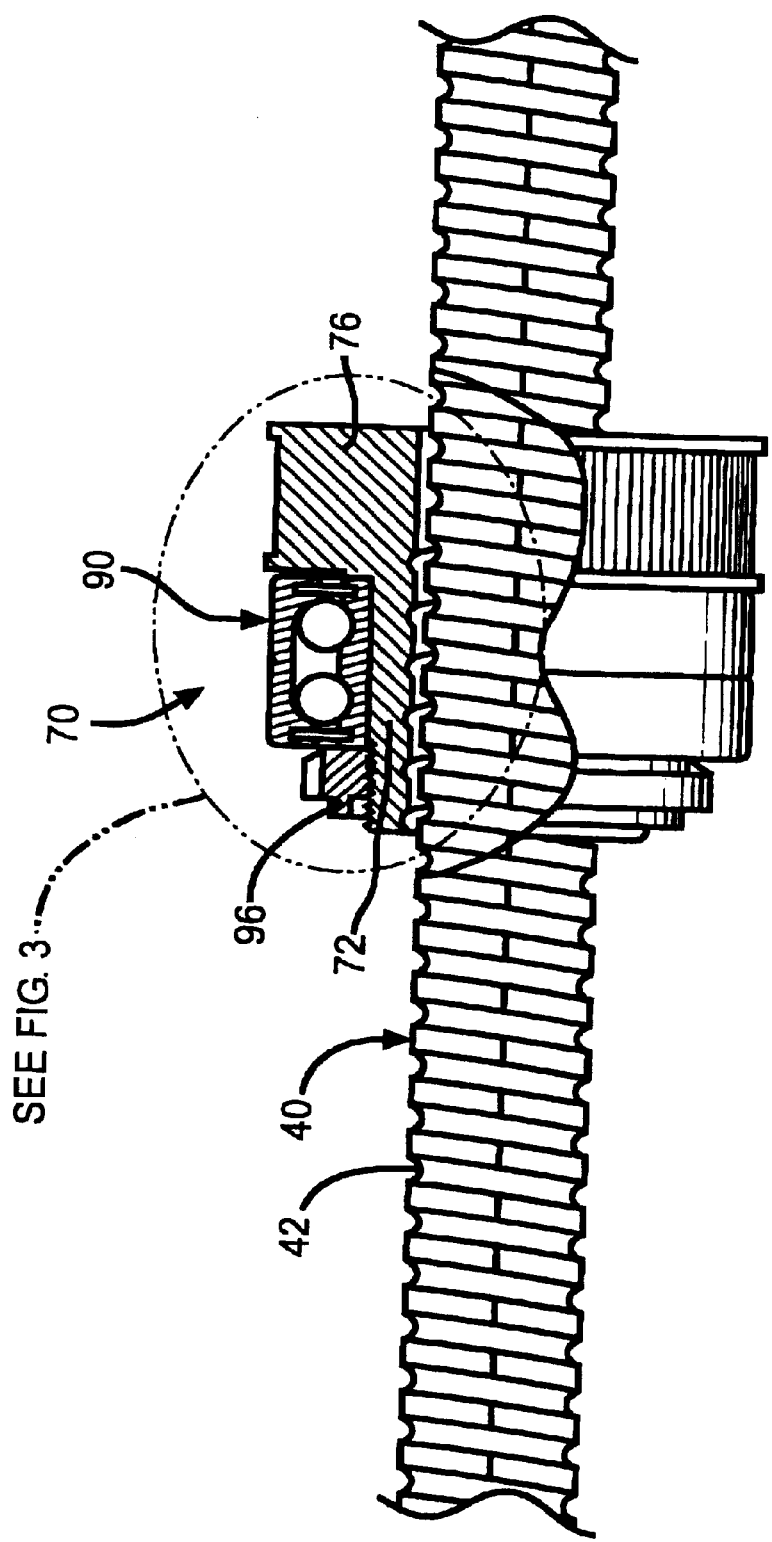
FIG. 2 is a view of a portion of the vehicle electric power steering assembly illustrated in FIG. 1.
Figure 3:
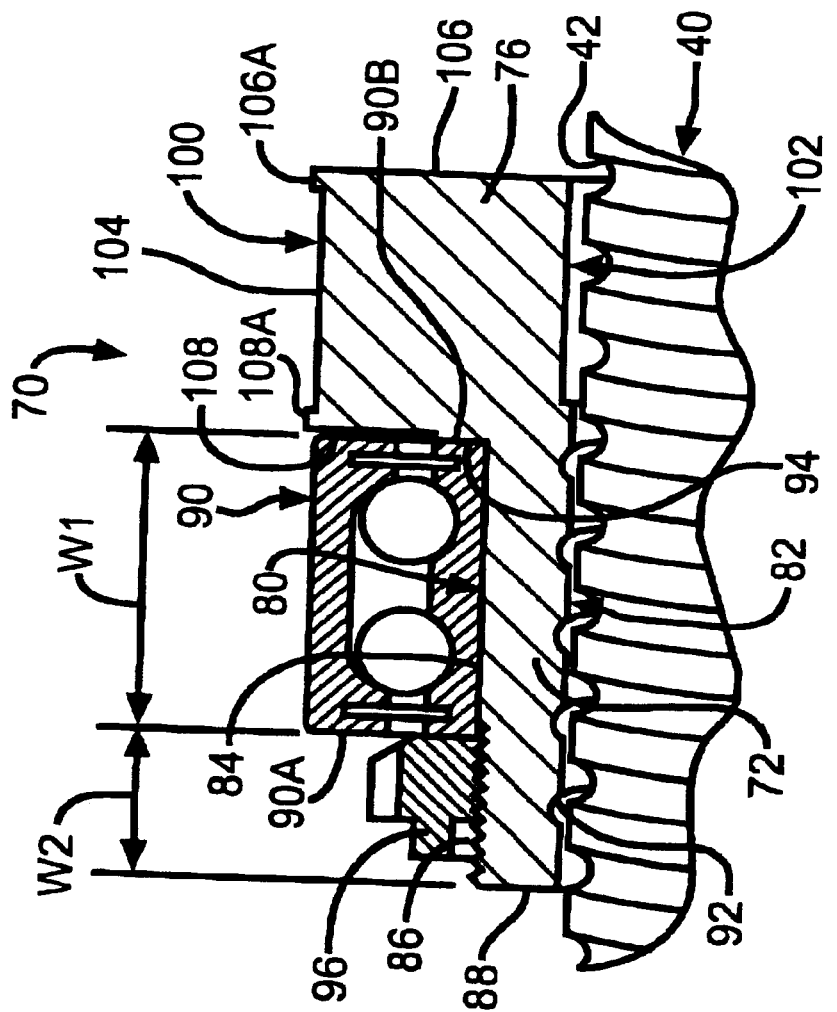
FIG. 3 is an enlarged sectional view of a portion of the vehicle electric power steering assembly illustrated in FIGS. 1 and 2.

Referring now to FIGS. 1–3, there is illustrated a first embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies.

The illustrated electric power steering assembly 10 includes a vehicle steering wheel 12 and a rotatable input shaft 14 which is operatively coupled in a manner not shown, to the steering wheel 12 for rotation therewith about a steering axis X1. A torque sensor 16 is located inside a pinion housing 18 and encircles the input shaft 12. The torque sensor 16 includes coils (not shown) which respond to the rotation of the input shaft 12 and which generate over electrical lines 20 an electrical signal indicative of the direction and magnitude of the applied steering torque.

A torsion bar 20 is provided to connect the input shaft 12 to a pinion 22 located inside the pinion housing 18. The torsion bar 20 twists in response to the steering torque applied to the steering wheel 12. When the torsion bar 20 twists, relative rotation occurs between the input shaft 12 and the pinion 22.

The pinion housing 18 is attached to a rack housing, indicted generally at 30. A linearly movable steering member 32 extends axially through the rack housing 30. The steering member 32 is linearly (or axially) movable along a rack axis X2. A rack portion 34 of the steering member 32 is provided with a series of rack teeth (not shown) which meshingly engage gear teeth (not shown) provided on the pinion 22. The steering member 32 further includes a screw portion 40 having an external thread convolution 42. The steering member 32 is connected with steerable wheels (not shown) of the vehicle through tie rods (not shown) located at the distal ends of the steering member 32. Linear movement of the steering member 32 along the rack axis X2 results in steering movement of the steerable wheels as is known manner.

The rack housing 30 has a generally cylindrical configuration and includes a first section 50, a second section 52 and a third section 54. The first section 50 is connected to the second section 52 by suitable means, such as for example by a plurality of bolts and nuts (not shown). Similarly, the second section 54 is connected to the third section 54 by suitable means, such as for example by a plurality of bolts and nuts (only the bolts shown in FIG. 1 by reference numbers 140). The first section 50 is provided with a radially enlarged end 50A, and the third section 54 is provided with a radially enlarged end 54A. The enlarged ends 50A and 54A of the respective sections 50 and 54 cooperate with the second section 52 to define an annular chamber 56. Alternatively, the structure of the rack housing 30 can be other than illustrated if so desired. For example, the rack housing 30 can include less than three sections or more than three sections if so desired.

The steering assembly 1 further includes an electric motor 60 which, as will be discussed below in detail, is drivably connected to a ball nut and pulley member, indicated generally at 70 for effecting axial movement of the steering member 32 upon rotation of the steering wheel 12. In the event of the inability of the electric motor 60 to effect axial movement of the steering member 32, the mechanical connection between the gear teeth on the pinion 24 and the rack teeth on the rack portion 34 of the steering member 32 permits manual steering of the vehicle. The ball nut and pulley member 70 is located in the chamber 56 of the rack housing 30 and encircles the screw portion 40 of the steering member 32.

As best shown in FIGS. 2 and 3, the ball nut and pulley member 70 is of a stepped configuration and includes a ball nut portion 72 and a pulley portion 76 which in the illustrated embodiment are preferably formed integral with one another as a one piece unit. The ball nut portion 72 includes a generally cylindrical outer surface 80 and a generally cylindrical inner surface 82. The cylindrical outer surface 80 of the ball nut portion 72 includes an axially extending non-threaded section 84, in the area defined by width W1, and an axially extending threaded section 86, in the area defined by width W2, adjacent an end 88 thereof. In the illustrated embodiment, the width W1 of the non-threaded section is greater than the width W2 of the threaded section.

The non-threaded section 84 of the ball nut member 72 defines a singular bearing seat surface for supporting a lone bearing unit 90. The cylindrical inner surface 82 of the ball nut portion 72 is provided with a screw thread convolution 92 formed thereon for a purpose to be discussed below. The ball nut portion 72 further includes a shoulder or flange 94 defined at an end thereof opposite the end 88. Alternatively, the structure of the ball nut portion 72 of the ball nut and pulley member 70 can be other than illustrated if so desired.

The bearing unit 90 is disposed on the bearing seat surface of the non-threaded section 84 of the cylindrical outer surface 80 of the ball nut portion 72. To accomplish this in the illustrated embodiment, a spanner nut 96 screws onto the threads provided on the threaded section 86 of the ball nut portion 72. As the spanner nut 96 is tightened against an adjacent end surface 90A of the bearing unit 90, an opposite end surface 90B of the bearing unit 90 engages the associated surface of the shoulder 94 of the ball nut portion 72 and loads the bearing unit 90. Alternatively, other methods can be used to retain and load the bearing unit 90 on the ball nut portion 72.

Figure 4:
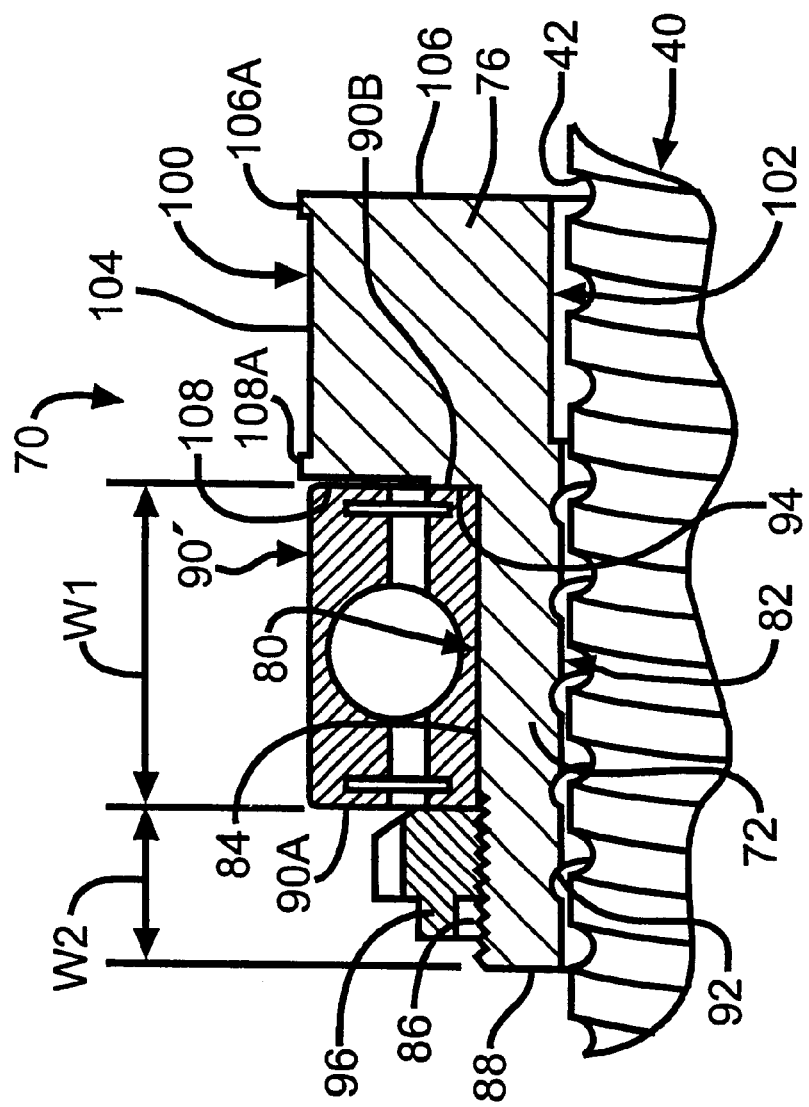
FIG. 4 is a sectional view of a portion of a second embodiment of a vehicle electric power steering assembly in accordance with the present invention.

As will be discussed below, the bearing unit 90 is operative to rotatably support the ball nut and pulley member 70 relative to the steering member 32. Alternatively, other methods can be used to retain the bearing unit 90 on the ball nut portion 72 and/or to rotatably support the ball nut and pulley member 70 relative to the steering member 32. In the illustrated embodiment, the bearing unit 90 is a double row angular contact bearing unit. Alternatively, the other types of bearing units can be used if so desired. For example; as shown in a second embodiment of the invention illustrated in FIG. 4, the bearing unit can be a single row four point contact bearing unit, indicated generally at 90'.

The pulley portion 76 of the ball nut and pulley member 70 includes a generally axially extending cylindrical outer surface 100 and a generally axially extending cylindrical inner surface 102. The cylindrical outer surface 100 of the pulley portion 76 includes an external toothed middle section 104 and a pair of opposed ends 106 and 108. The opposed ends 106 and 108 define an axial width W3. The ends 106 and 108 are provided with a continuous extending raised annular lip 106A and 108A, respectively, formed thereon. The lips 106A and 108A extend radially outwardly relative to the surface of the external toothed middle section 104 so as to assist in retaining a timing belt 124 thereon, as will be discussed below. Alternatively, the structure of the pulley portion 76 of the ball nut and pulley member 70 can be other than illustrated if so desired. Also, as best shown in FIG. 3, the end 108 of the pulley member is offset relative to the shoulder 94 of the ball nut member 72 so that the end surface 90B of the bearing unit 90 only engages the associated surface of the shoulder 94.

Alternatively, the structure of the ball nut and pulley member 70 can be other than illustrated if so desired. For example, instead of the ball nut portion 72 being on the left side of the pulley member 76 (when viewing FIGS. 1–3), the ball nut portion 72 can be on the right side of the pulley member 76. Also, instead of the ball nut portion 72 and the pulley portion 76 being an integral one piece unit, the ball nut portion 72 and the pulley portion 76 can be separate members and directly connected to each other by appropriate means, such as for example, by bolts, keys, other suitable fasteners or the like.

The ball nut and pulley member 70 further includes a plurality of force-transmitting members 110. The force transmitting members 110 comprise balls (shown in FIG. 1), which are disposed between the internal screw thread convolution 92 of the ball nut portion 72 and the external thread convolution 42 on the screw portion 40 of the steering member 32. The balls 110 are loaded into the ball nut portion 72 in a known manner. The ball nut and pulley member 70 further includes a recirculation passage (not shown) for recirculating the balls 110 upon axial movement of the steering member 32 relative to the ball nut and pulley member 70.

The electric motor 60 is supported relative to the rack housing 30 by suitable means. The electric motor 60 includes an output shaft 122 which is connected to a member 124 for rotation therewith. In the illustrated embodiment, the member 124 is a timing belt. The timing belt 124 is operatively connected to the toothed middle section 104 of the pulley portion 76 of the ball nut and pulley member 70. Thus, when the electric motor 60 is actuated, the timing belt 124 is rotated via the output shaft 122 so as to rotate the pulley member 76 of the ball nut and pulley member 70. The rotation of the pulley member 76 causes the simultaneous rotation of the ball nut portion 72 thereby effecting axial movement of the steering member 32 via the balls 110.

The steering assembly 10 further includes an electronic control unit or controller 130. The controller 130 is preferably secured to the rack housing 30 in a manner not shown. The controller 130 is electrically connected to the electric motor 60 by electrical lines 132 and is electrically connected by the electrical lines 20 to the torque sensor 16. The controller 130 is operable to receive electrical signals from the torque sensor 16 and to control the electric motor 60 in accordance with the received electrical signals. When steering torque is applied to the vehicle steering wheel 12, the input shaft 14 rotates about the axis X1. The direction and magnitude of the applied steering torque are sensed by the torque sensor 16. The torque sensor 16 outputs an electrical signal to the controller 130. The electric motor 60 is energized by a control signal transmitted to the electric motor 60 by the controller 130, and the motor output shaft 122 of the electric motor 60 is caused to rotate about a motor axis X3.

The rotating motor shaft 162 rotates the pulley member 76 via the belt 124 which in turn transmit the drive force of the electric motor 60 to the ball nut portion 72 of the ball nut and pulley member 70. The rotation of the ball nut portion 72 results in linear movement of the steering member 32. The balls 110 transmit the rotation force of the ball nut member 72 to the rack portion 34 of the steering member 32. Because the ball nut portion 72 is fixed in position axially, the steering member 32 is driven to move axially in response, effecting steering movement of the steerable wheels of the vehicle. The electric motor 60 thus provides steering assist in response to the applied steering torque.

One advantage of the electric power steering assembly 10 of the present invention is that the ball nut and pulley member 70 is more compact (i.e., takes up less space in an axial direction), compared to that in above mentioned Shimizu '972 patent. Thus, the ball nut and pulley member 70 of the present invention provides a packaging advantage over prior electric power steering assemblies wherein the ball nut and the pulley are separate parts. Also, the ball nut and pulley member 70 of the present invention can rotatably support the ball nut portion 72 thereof using only one bearing unit. Thus, the ball nut and pulley member 70 of the present invention provides a cost advantage over prior electric power steering assemblies wherein two bearing units are used.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:

a steering member disposed in a rack housing and including a rack portion operatively connected to a vehicle steering wheel and a screw portion;

a one piece integral ball nut and pulley member operatively connected to said screw portion of said rack portion of said steering member for effecting axial movement of said steering member upon rotation of the vehicle steering wheel, said ball nut and pulley member assembly including a ball nut portion and a pulley portion;

a lone bearing unit carried by said ball nut and pulley member for rotatably supporting said ball nut portion relative to said steering member; and an electric motor operatively connected to said ball nut and pulley member by said pulley portion.

2. The rack drive assembly according to claim 1 wherein said ball nut portion includes a generally cylindrical outer surface and a generally cylindrical inner surface, said cylindrical outer surface including an axially extending non-threaded section and an axially extending threaded section, said non-threaded section defining a singular bearing seat surface for supporting said lone bearing unit, said threaded section adapted to receive a fastener thereon to load said bearing unit, and said cylindrical inner surface provided with a screw thread convolution formed thereon.

3. The rack drive assembly according to claim 2 wherein said ball nut portion further includes a shoulder provided at an end of said non-threaded section, said shoulder being offset relative to an adjacent surface of said pulley member, and said shoulder adapted to engage an associated surface of said bearing unit when said bearing unit is loaded.

4. The rack drive assembly according to claim 1 wherein said lone bearing unit is a double row angular contact bearing unit.

5. The rack drive assembly according to claim 1 wherein said pulley portion includes a generally axially extending cylindrical outer surface and a generally axially extending cylindrical inner surface, said cylindrical outer surface including external teeth provided thereon.

6. The rack drive assembly according to claim 5 wherein said external teeth are provided in a middle section of said cylindrical outer surface and a pair of opposed ends of said cylindrical outer surface are provided with a continuous extending raised annular lip formed thereon to assist in retaining a drive belt thereon.

7. The rack drive assembly according to claim 1 wherein said non-threaded section of said ball nut portion defines a first axial width and said threaded section of said ball nut portion defines a second axial width which is less than said first axial width.

8. A rack drive assembly adapted for use in a vehicle electric power steering assembly comprising:

a steering member disposed in a rack housing and including a rack portion operatively connected to a vehicle steering wheel and a screw portion;

a one piece integral ball nut and pulley member operatively connected to said screw portion of said rack portion of said steering member for effecting axial movement of said steering member upon rotation of the vehicle steering wheel, said ball nut and pulley member assembly including a ball nut portion and a pulley portion, said ball nut portion including a generally cylindrical outer surface and a generally cylindrical inner surface, said cylindrical outer surface including an axially extending non-threaded section and an axially extending threaded section, said non-threaded section defining a singular bearing seat surface, and said cylindrical inner surface provided with a screw thread convolution formed thereon.;

a lone bearing unit disposed on said singular bearing seat surface of said ball nut portion for rotatably supporting said ball nut portion relative to said steering member;

a threaded fastener disposed on said threaded section of said ball nut portion, said fastener adapted to load said bearing unit; and an electric motor operatively connected to said ball nut and pulley member by said pulley portion.

9. The rack drive assembly according to claim 8 wherein said ball nut portion further includes a shoulder provided at an end of said non-threaded section, said shoulder being offset relative to an adjacent surface of said pulley member, and said shoulder adapted to engage an associated surface of said bearing unit when said bearing unit is loaded.

10. The rack drive assembly according to claim 8 wherein said tone bearing unit is a double row angular contact bearing unit.

11. The rack drive assembly according to claim 8 wherein said pulley portion includes a generally axially extending cylindrical outer surface and a generally axially extending cylindrical inner surface, said cylindrical outer surface including external teeth provided thereon.

12. The rack drive assembly according to claim 11 wherein said external teeth are provided in a middle section of said cylindrical outer surface and a pair of opposed ends of said cylindrical outer surface are provided with a continuous extending raised annular lip formed thereon to assist in retaining a drive belt thereon.

13. A rack drive assembly adapted for use in a vehicle electric power steering assembly comprising:

a steering member disposed in a rack housing and including a rack portion operatively connected to a vehicle steering wheel and a screw portion;

a one piece integral ball nut and pulley member operatively connected to said screw portion of said rack portion of said steering member for effecting axial movement of said steering member upon rotation of the vehicle steering wheel, said ball nut and pulley member assembly including a ball nut portion and a pulley portion, said ball nut portion including a generally cylindrical outer surface and a generally cylindrical inner surface, said cylindrical outer surface including an axially extending non-threaded section and an axially extending threaded section, said non-threaded section defining a singular bearing seat surface, said cylindrical inner surface provided with a screw thread convolution formed thereon, said ball nut portion including a shoulder provided at an end of said non-threaded section, said shoulder being offset relative to an adjacent surface of said pulley member;

a lone bearing unit disposed on said singular bearing seat surface of said ball nut portion for rotatably supporting said ball nut portion relative to said steering member;

a threaded fastener disposed on said threaded section of said ball nut portion and adapted to load said bearing unit, said shoulder of said ball nut portion engaging an associated surface of said bearing unit when said bearing unit is loaded; and an electric motor operatively connected to said ball nut and pulley member by said pulley portion.

14. The rack drive assembly according to claim 13 wherein said lone bearing unit is a double row angular contact bearing unit.

15. The rack drive assembly according to claim 13 wherein said pulley portion includes a generally axially extending cylindrical outer surface and a generally axially extending cylindrical inner surface, said cylindrical outer surface including external teeth provided thereon.

16. The rack drive assembly according to claim 15 wherein said external teeth are provided in a middle section of said cylindrical outer surface and a pair of opposed ends of said cylindrical outer surface are provided with a continuous extending raised annular lip formed thereon to assist in retaining a drive belt thereon.

* * * * *